United States Patent [19]

Lindsey

[11] Patent Number: 5,875,331
[45] Date of Patent: *Feb. 23, 1999

[54] SYSTEM AND METHOD FOR GENERATING TARGET LANGUAGE CODE UTILIZING AN OBJECT ORIENTED CODE GENERATOR

[75] Inventor: Anthony Hayden Lindsey, Fuquay Varina, N.C.

[73] Assignee: International Business Machines Corp., Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 315,743

[22] Filed: Sep. 30, 1994

[51] Int. Cl.$^6$ ....................................................... G06F 9/45
[52] U.S. Cl. ............................................................ 395/702
[58] Field of Search .................................... 395/701, 702, 395/703, 704, 705, 707, 500, 161, 600, 419, 700, 710

[56] References Cited

U.S. PATENT DOCUMENTS 5,446,902 8/1995 Islam ....................................... 395/700

FOREIGN PATENT DOCUMENTS

WOA9004829 5/1990 United Kingdom .............. G06F 9/44

OTHER PUBLICATIONS

Oops Messenger, V5, No. 3, Jul. 1994, New York, U.S., pp. 6–16 Karakostas et al., "Combined Use of Languages in Object Oriented Software Construction".

European Search Report, Application No. EP 95 480120, The Hague, Jan. 11, 1996, J. Brandt.
Knowledge Assisted Software Engineering, Caseworks, Inc., 1992.
Implementing Technology Visions . . . Corporate Overview, Caseworks, Inc., Atlanta, GA, 1992.
Cox et al., "Producer A Tool for Translating Smalltalk–80 to Objective–C," OOPSLA '87, Association for Computing Machinery (ACM), Oct. 8, 1987.
Bobrow et al., "CommonLoops Merging Lisp and Object–Oriented Programming," OOPSLA '87, Association for Computing Machinery (ACM), Oct. 2, 1986.
Fukunaga et al., "An Experience with a Prolog–based Object–Oriented Language," OOPSLA '86, Association for Computing Machinery (ACM), Oct. 2, 1986.
Wilson et al., "Comparative Programming Languages," Addison–Wesley, p. 316, 1993.

*Primary Examiner*—James P. Trammell
*Assistant Examiner*—Peter J. Corcoran, III
*Attorney, Agent, or Firm*—Gregory M. Doudnikoff

[57] ABSTRACT

A system for generating target language source code utilizing an object oriented code generator is disclosed. A desired computer programming function is specified using a fourth generation language. An object oriented converter converts the fourth generation language specification into an object oriented model which retains the function and interrelationships defined in the specification. The object oriented model is applied against a set of source code templates for a desired target language, which will typically be a third generation language. An object oriented generator engine parses the resulting collection of templates to form source code files having the desired programming function in the desired target language.

8 Claims, 6 Drawing Sheets

SYSTEM AND METHOD FOR GENERATING TARGET LANGUAGE CODE UTILIZING AN OBJECT ORIENTED CODE GENERATOR

BACKGROUND OF THE INVENTION

1. Summary of the Invention

The present invention is directed toward a system and method for generating source code in target languages using an object oriented code generator. More particularly, the present invention is directed to a system and method in which input fourth generation language design code is modified into an object oriented design, which is then mapped against source code templates for a target language and processed by a generator algorithm to produce source code files in the target language.

2. Description of the Related Art

A commonly held notion in present day computer technology is that developments in computer software are lagging far behind developments in computer hardware. In part, this is certainly due to the relatively large number of computer languages, the wide range of computer programming skills necessary to develop a single robust and complete computer program, the great divergence in functionality between computer programs used in different industries, and the relative lack of highly skilled computer programmers. It is quite difficult for a single programmer, working in a third generation language (3GL) such as C, Cobol or Fortran, to have the skills necessary to build a robust and complete program, including the required functionality, graphical user interface, etc., which will stand up to the rigors of heavy duty or industrial strength use, or be reliable enough to be employed in critical situations, such as those having banking or military applications.

Given this situation, a number of systems have been developed in recent years which attempt to lower the skill level required to write computer programs, and what are known as fourth generation languages (4GLs) were developed. In fourth generation languages, syntax is simpler and the programmer must specify fewer statements than in 3GLs; thus, the learning curve for new users is lower. However, the trade-off for this relative ease of use is less control of the actual processing carried out by the program written in the 4GL. The code that a programmer writes in a fourth generation language is more concise but more remote from the actual machine instructions carried out by the computer processor than is the code written by a programmer in a third generation language.

Fourth generation languages have been incorporated into a number of tools to simplify the programming process, including what are known as source code generators. Traditional source code generator tools receive user input design, which the user inputs in the fourth generation language, and process this fourth generation language design utilizing a source code generator engine which outputs source code having functionality corresponding to the input design in a specific output language. The output is typically a 3GL (but can be a proprietary language that will be interpreted by a run-time engine during execution). The generator engine basically maps individual components of the 4GL code design input by the user to corresponding predefined source code snippets in the 3GL. The generator engine performs this mapping function for each basic component of the 4GL design code, and outputs a source file in the desired language.

Such generator systems have a number of drawbacks. For example, traditional systems lack extensibility and are difficult to modify. Quite often, the predefined 3GL snippets are dispersed throughout the generator engine. Making a modification to a 3GL snippet requires detailed knowledge of the generator engine. Similarly, attempting to improve or extend the capabilities of the generator engine by adding 3GL snippets can be quite complex given the problems with finding and addressing the affected generator functionality and locations of affected 3GL code snippets. The resulting generator engine would be more complex and less organized. Further, the code generated by many such systems is often only the shell of the 3GL program which is desired by the user. This is due to the inexactness of the mappings and the inherent limitations found with such systems.

One attempt to overcome some of the problems of traditional source code generators can be found in U.S. Pat. No. 5,159,687, which issued to Richburg on Oct. 27, 1992. The patent describes a number of different knowledgebases which may be used in automatic generation of programming code in different languages. Literature from the assignee of the patent, Caseworks, Inc. of Dunwoody, Ga., describes a product which includes a number of different extensible knowledgebases for use by a code generator in producing the graphical user interface portions of applications in several different 3GL languages. The described product utilizes a proprietary language in order to maintain and extend the various knowledgebases. So, while an attempt has been made to address the problem of extensibility and the lack of modifiability, a new level of complexity has been added by requiring users to learn a proprietary language that has limited application elsewhere, and the basic questions of complexity, completeness and the inherent mapping limitations still apply.

Accordingly, a need exists for an improved code generator which is flexible to maintain and extend and capable of producing complete source code output files in multiple languages.

SUMMARY OF THE INVENTION

Accordingly, an object of the present invention is to provide a system for generating source code files in a target language which requires a minimum of programmer intervention to obtain the desired functions.

Another object of the present invention is to provide a source code generator which produces output source code files which are more complete and more accurately match the desired functions than those produced using traditional source code generators.

Yet another object of the present invention is to provide a highly extensible and easily modifiable source code generator.

Still another object of the present invention is to provide a source code generator which is relatively easy to maintain and update as the requirements for code generation change.

To achieve the foregoing objects, and in accordance with the purpose of the invention as broadly described herein, in a computing environment, a system for converting a fourth generation language specification into target language source code is provided comprising means for creating a fourth generation language specification representing desired computing functions; means for converting the fourth generation language specification into an object oriented model of the fourth generation language specification; code templates comprising fragments of code; means for mapping the object oriented specification to the code templates; and means for parsing the mapped code templates to produce source code in a desired target language. The system further comprises an object oriented execution environment for enabling execution of object oriented code and the code templates further comprise object oriented code and fragments of source code in a target language. The parsing means further causes the object oriented code in the mapped code templates to be executed with the object oriented execution environment to generate additional source code fragments to be combined with the fragments of source code from the mapped source code templates. The system may also provide a set of code templates for each of the target languages available using the system, and the mapping means may map the object oriented model to the set corresponding to a desired one of the available target languages. The system may further comprise means for designating a target language.

A system is also provided for converting an object oriented program into target language code, comprising a set of source code templates corresponding to each available target language, each of the source code templates comprising source code fragments in its corresponding target language and object oriented code; an object oriented execution environment capable of executing the object oriented code; mapping means for mapping each object in the object oriented program to the source code template which corresponds to the object in the set of source code templates which corresponds to the target language; and means for parsing the mapped source code templates by extracting the source code fragments from each mapped source code template, executing the object oriented code in each mapped source code template to produce additional source code fragments, combining the additional source code fragments and the source code fragments, and outputting resulting source code.

These and other features, aspects, and advantages of the present invention will become better understood with reference to the following description, appended claims, and accompanying drawings in which like reference numbers denote the same element.

DESCRIPTION OF THE PREFERRED EMBODIMENT

The invention described herein is related to that described in commonly assigned and copending U.S. patent application Ser. No. 08/316,174, entitled "Object Oriented System and Method for Generating Target Language Code", having the same inventor and filed on even date herewith, which is hereby incorporated by reference in its entirety.

Figure 1:
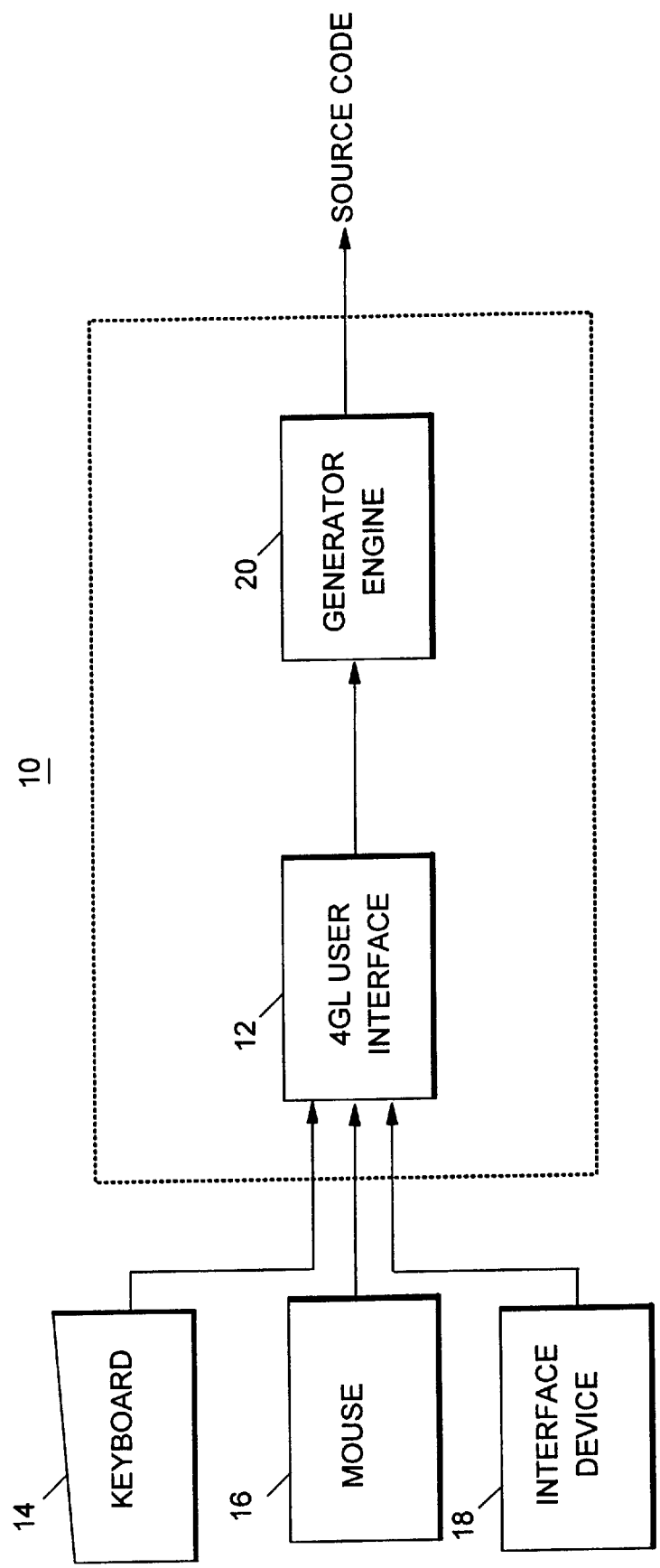
FIG. 1 is a block diagram of a prior art source code generating system.

A prior art source code generating system will now be described with reference to FIG. 1.

In a typical source code generator, a 4GL source code generator tool 10 resident in a computing environment accepts user input via its 4GL user interface 12. A user specifies the desired programming function by interacting with the 4GL user interface 12 through known means, such as a keyboard 14, mouse 16, or other interface device 18. In this manner, the user constructs a 4GL specification of a program having desired functions in the 4GL language. The 4GL specification is then provided to a generator engine 20 of the generator tool 10. Most traditional generator engines include 3GL source code statements for all potential target languages embedded therein. Fourth generation language specification statements are matched with corresponding 3GL source code statements in the generator engine 20, syntax of the 4GL is preserved in the set of 3GL statements and the resulting set of 3GL source code statements are output. The output 3GL source code statements may comprise a complete program, a portion of a program, or a shell of a program, depending on the complexity of the generator tool 10 and the completeness of the 4GL input from the user.

As is known to those skilled in the art, a source code generator is implemented with computer readable code, also known as software, which is executed in a hardware environment, such as that described above relative to FIG. 1. The flow charts of FIGS. 3 and 4 describe logical processes carried out by software implementing the present invention. Software program code which implements the present invention is typically stored in memory of some type within the computing hardware environment. The software program code may be embodied on any of a variety of known media for use by the data processing system, such as a diskette or CD-ROM. The program code may be distributed on such media, or may be distributed to users from the memory of one computer system over a network to other computer systems for use by users of such computer systems. Such techniques and methods for embodying software code on media and/or distributing the software code are well-known, and will not be further discussed herein.

The problems and limitations associated with such a system have been discussed above. The present invention solves the problems and circumvents the limitations by applying object oriented technology to source code generation, as will now be described with reference to FIGS. 2 through 4B. The present invention can be performed in any of a variety of known computing environments. These environments typically include a processor, memory, and a user interface, such as a monitor which employs a keyboard and a mouse to receive user input. For example, the invention may be implemented at a stand-alone workstation or in a client/server environment.

A source code generator tool 30 in accordance with the present invention preferably employs a 4GL in which a user specifies desired programming functions and/or entire programs or applications. A user utilizes known input means, such as a keyboard 14, mouse 16, or other interface device 18, to interact with a 4GL user interface 32. The 4GL user interface 32 is preferably implemented in accordance with known techniques, such as the 4GL user interface of a prior art source code generator tool. The user utilizes the 4GL user interface 32 to develop a specification for the desired programming functions, which will be in the form of 4GL statements (Step 100 of FIG. 3A).

The 4GL specification is provided to an object oriented converter 34, which converts the 4GL specification into an object oriented model of the 4GL specification. Logic items of the 4GL specification are converted into logic-oriented objects (Step 102) and data items of the 4GL specification are converted into data-oriented objects (Step 104).

This conversion is accomplished as follows. The typical 4GL comprises a fixed number of logic components and data components. The object oriented converter 34 includes object oriented constructs which correspond to the components available to a user in the 4GL. In the preferred embodiment, the object oriented constructs are from the Smalltalk language. One Smalltalk class is provided for each possible logic component and for each possible data component of the 4GL. In an object oriented language, a class is the template for the creation of a class instance. An instance of a class is called an object. The class is the specification of the object, in that the class includes a complete description of the resulting object's attributes, behaviors and implementation. The behavior of an object is surfaced via received requests, which are called messages. A message maps to a method defined within an object's class, each method being composed of messages for other objects and at their most basic level, performing actual processing by causing execution of routines, calling dynamic link libraries, etc. The objects created in accordance with the present invention will also contain instance data, which can also be manipulated using messages.

Because of the described nature of the object oriented constructs, the conversion of the logic and data items of the 4GL specification into the corresponding logic-oriented and data-oriented objects is relatively straightforward. The 4GL specification is essentially an ordered collection of the available components from the 4GL, as selected by the user. Each component can be used many times or never at all in the specification. The object oriented converter 34 includes a class which corresponds to each component from the 4GL. Certain classes within the object oriented converter 34 are logic-oriented, while others are data-oriented. The object oriented converter 34 maps each item from the 4GL specification to the object oriented class which corresponds to the item's 4GL component. Thus, the object oriented model of the 4GL specification is basically a collection of logic-oriented and data-oriented objects, which inter-relate based on instance data and instance methods, in a fashion that preserves the semantics of the 4GL specification. Examples of the logic components include a MoveStatement class and an Application class. Examples of data components include an IndexedRecord class and a NumericDataItem class. Thus, the object oriented converter 34 turns the logic and data items from the 4GL specification into instances of the logic-oriented and data-oriented classes which comprise the object oriented model.

The resulting object oriented model is also essentially an object oriented application or program, which is capable of being executed by the appropriate execution environment. In the preferred embodiment, the resulting model will thus be a Smalltalk application or program, and the execution environment typically includes an appropriate Smalltalk virtual machine and Smalltalk image. These enable the sending of messages between objects, include and execute basic processing routines and functions represented by the methods, provide the appropriate interfacing with the underlying operating system, etc. Since execution of the Smalltalk code in the object oriented model will be necessary in the conversion of the model into the target language, the generator tool 30 preferably includes the necessary elements of a Smalltalk virtual machine and image so that execution may occur. While in the preferred embodiment, the Smalltalk execution environment 44 is provided with the generator tool 30, the execution environment may be located elsewhere in the computing environment, as long as it can be accessed by the generator tool 30.

The generator tool 30 also includes an object oriented generator engine 36. The generator engine 36 has memory associated therewith, and the object-converted 4GL design is input into associated memory (Step 106). The object oriented generator engine 36 has also associated therewith one or more sets of target language specific source code templates, which are also stored in associated memory or memory which is accessible by the engine 36, and the base Smalltalk execution environment that will permit execution of Smalltalk code. Although the steps of the source code generation process will be described as part of the function of the generator engine 36, these steps can be distributed.

Figure 2:
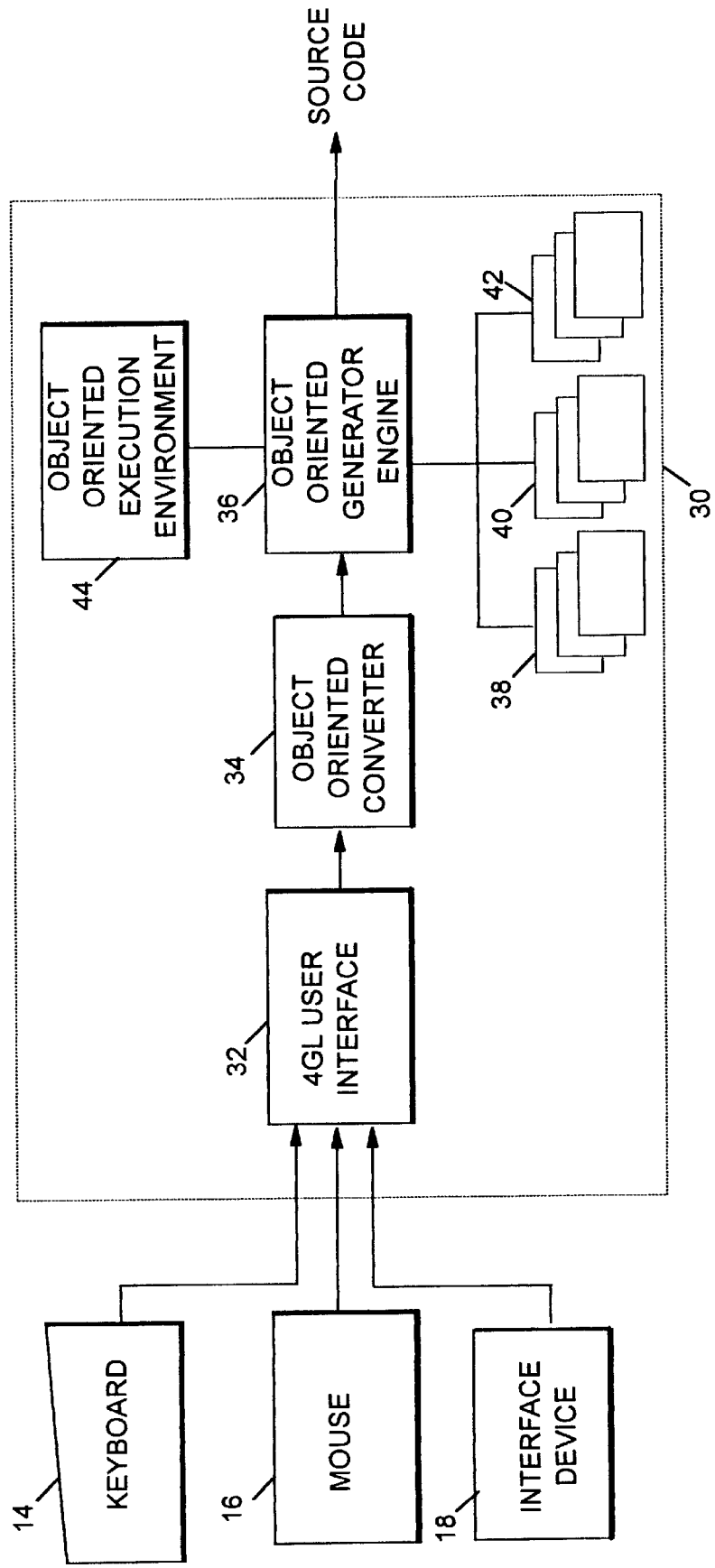
FIG. 2 is a block diagram of an object oriented source code generating system in accordance with the present invention.

In FIG. 2, three sets of source code templates 38, 40, 42 are illustrated. One set of source code templates is provided for each target language available through the generator tool 30. Typically, the target language will be a 3GL, such as C or COBOL. However, the target language may be another 4GL or an object oriented language. However, the discussion below is directed to the situation in which the target language is a 3GL. This architecture permits the source code generator tool 30 to be completely extensible, and practically any number of additional sets of source code templates representing additional target languages may be added without affecting performance. Each source code template in each set of templates corresponds to one of the available classes in the object oriented converter 34, and each class in the object oriented convertor 34 corresponds to an -available component of the 4GL.

An object oriented execution environment 44 is also illustrated in FIG. 2. The execution environment is shown as being separate from the generator engine 36, but in practice it may be embedded in the generator engine and only include those basic portions of the execution environment necessary for the components of the object oriented language available via the convertor 34, or may be the complete execution environment but be physically located elsewhere within a computing environment and utilized by any number of tools or applications, and not only the generator tool 30.

By utilizing an object oriented model of the 4GL specification, much of the complexity usually found in the generator engines involved with converting 4GL input into 3GL source code program is eliminated. The generator engine 36 of the present invention carries out the steps of mapping each object in the model to a corresponding source code template for the target language and parsing the mapped template. To carry out the latter step, the generator engine 36 includes a generator algorithm which parses the mapped source code templates into complete source code statements in the target language in accordance with the contents of the objects in the model. The object oriented code in the template is executed in conjunction with the model and environment 44 during the parsing. This parsing will be described in more detail below in Step 114 of FIG. 3B and with reference to FIG. 4A and 4B. This architecture of the generator tool 30, which includes the separation of the target language source code from the generator engine, and the use of an object oriented model to represent the 4GL specification, also enables extensibility of the functions available to users via the 4GL interface 32 with relative ease. New programming function can be added by adding additional source code templates to each or all sets of source code templates, adding corresponding classes in the object oriented convertor 34, and adding corresponding 4GL logic and/or data components for specification via the user interface 32 with little or no affect to other components, classes, function or templates of the user interface 32, object oriented convertor 34, object oriented generator engine 36, or source code templates 38, 40, 42, respectively.

A target language must be identified so that the object oriented model will be applied to the proper set of source code templates 38,40,42 (Step 108). The target language can be input by the user when the user creates the 4GL specification, or it can be specified by the user when the mapping is about to occur. Additionally, one of the available languages can be utilized as a default target language if the user does not specify a target language. Further, each object-converted model may be held in memory until it is needed by a user in one of the available languages. The model can then be accessed from memory, the target language specified by the user, and processing carried out to provide source code in the specified target language, as will be described below. When template mapping has been completed, the model may be returned to or retained in memory and accessed at a later time for conversion to a different language.

The object oriented generator engine 36 then processes the object oriented model of the 4GL specification. Since most target languages require that data definitions be produced first, the object oriented generator engine 36 first gathers all data-oriented objects from the object oriented model and, after mapping these objects and their corresponding source code templates from the set of source code templates in the target language, outputs source code data definitions in the target language and smalltalk instructions which comprise the corresponding source code template to associated memory (Step 110). Likewise, the object oriented generator engine 36 then gathers all logic-oriented objects and, after mapping these objects and their corresponding source code templates from the set of source code templates in the target language, outputs source code logic statements in the target language and smalltalk instructions which comprise the corresponding source code template to associated memory (Step 112). When all of the objects have been mapped in this way to their corresponding templates, the output is parsed and executed in accordance with a generator algorithm in the object oriented generator engine 36 (Step 114).

In most cases, each source code template will consist of two components, the first being an actual target language source code fragment and the second component being a generator directive which includes, in the preferred embodiment, smalltalk code which executes during the parsing process. The smalltalk code within the generator directive, when executed, provides the generator engine 36 with the appropriate target language string to complete the target language source code fragment supplied by the source code template. Each generator directive is composed of two parts, the first being an object identifier and the second being a message identifier. The object identifier identifies which object from the object oriented model should receive the message represented by the message identifier. During parsing, the message is sent to the identified object utilizing the object oriented execution environment 44, and a return value will be returned from the identified object. The return value is an additional source code fragment, but generally is the VARIABLE portion, such as a variable name, an entry point name, etc. The generator algorithm appends the return value to the source code fragment from the source code template. It is in this way that the objects in the object oriented model participate in the source code generation process. For example, a MoveStatement object responds with a source code fragment that represents the way to reference its SOURCE and TARGET operandi within the various target languages.

As discussed above, processing of each mapped source code template by the generator engine 36 results in a string of actual target language source code. The typical program created using the tool 30 will include a large quantity of such strings. The following is an example of the declaration source code template in the C language for a data-oriented object known as the NumericDataItemObject and called "IdNumber", which represents a numeric data entity in the 4GL specification:

*int <self VarName>;*

The source code fragment portion of this source code template consists of the strings "int" and ";", while the generator directive is the portion which consists of "<self varName>". The "<" and ">" symbols are arbitrary delineators which indicate the beginning and end of the generator directive. The object identifier in the generator directive is the token "self", which refers to the object being asked to generate itself as a variable declaration, namely "IdNumber". The message identifier is the token "varName", which will be the message sent to the object "self". This message tells the object "self" to return the string representing itself when used in a variable declaration. In this example, the NumericDataItemObject, whose name is "IdNumber", will return the string "idNumber". The resulting target language source code fragment is "int idNumber;", which is a C language source code fragment.

It should be noted that this object could respond with any string, not just its name. This might be necessary, for example, if its name is longer than the allowable length for variable names in the target language.

In summary, the source code template parser processes the language specific source code template against the object oriented model, causes the Smalltalk code within the generator directives to execute, and produces the completed source code string in the target language. The actual parsing of the source code templates will now be described with reference to the flowchart of FIGS. 4A and 4B.

In Step 200, one of the source code templates is input to the parser. In Step 202, the source code fragment portion of the source code template is output to cache memory. That is, the content of the source code template is written to the cache until the "<" symbol is reached, which indicates the end of the source code fragment and the beginning of the generator directive, or until the end of the source code template is reached. The latter is likely to occur in complex source code templates when the source code fragment follows an already processed generator directive and no additional source code directive is included in the source code template, or when the source code template includes no generator directive. If it is found that the end of the source code template has been reached (Step 204), then the processing proceeds to Step 216, which will be discussed below. If it is determined that the generator directive has been reached, which occurs when the "<" symbol has been reached (Step 206), the "<" symbol is discarded, and the generator algorithm reads the object and message identifiers which follow which comprise the generator directive (Step 208). The smalltalk code which comprises the identifiers is executed by the execution environment 46. The message identifier is sent as a message to the object in the object oriented model identified by the object identifier (Step 210). The value or text or string which is then returned in response to sending the message is output to the cache. In cache, the return value is combined with the source code fragment portion of the template to extend the target language source code string in cache (Step 212). The ">" symbol is then discarded, and a determination is made as to whether the individual source code template being parsed has been completely parsed (Step 214). If not, the parsing process returns to Step 202, and continues until the source code template is completely parsed. If the source code template has been completely parsed, the parsing process proceeds to Step 216.

If it is determined in Step 216 that the mapped source code template is the last source code template to be parsed, then the parsing process ends. Otherwise, the next source code template for parsing is determined (Step 218) and input to the parser for parsing (Step 200).

The parsing process utilizes the strengths of object oriented technology to maintain the inter-relationships of various components of the desired programming which were originally input in the 4GL. The inter-relationships are maintained in the object oriented model, and forwarded into the target language code by the execution of the smalltalk code, which provide strings which are combined with the source code fragments from the source code templates.

The cache memory is periodically checked to determine whether the cache is full or in danger of overflowing (Step 220). If either condition is found, then the contents of the cache are emptied into source code files for the desired program in the target language (Step 222). Additionally, the contents of the cache will be output to the source code files following the parsing of the last source code template (Step 224).

Figure 3A:
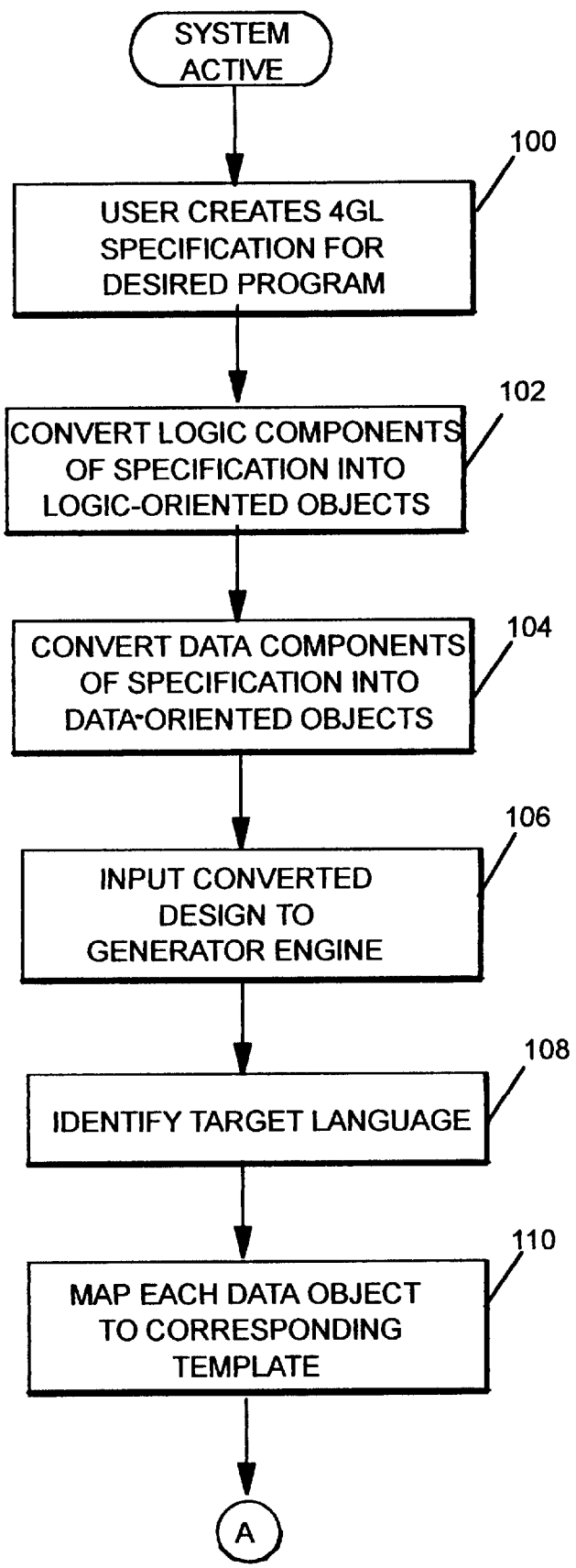
FIGS. 3A and 3B illustrate is a flow chart describing how 4GL program specifications are processed and converted by the system of FIG. 2 in accordance with the present invention.
Figure 3B:
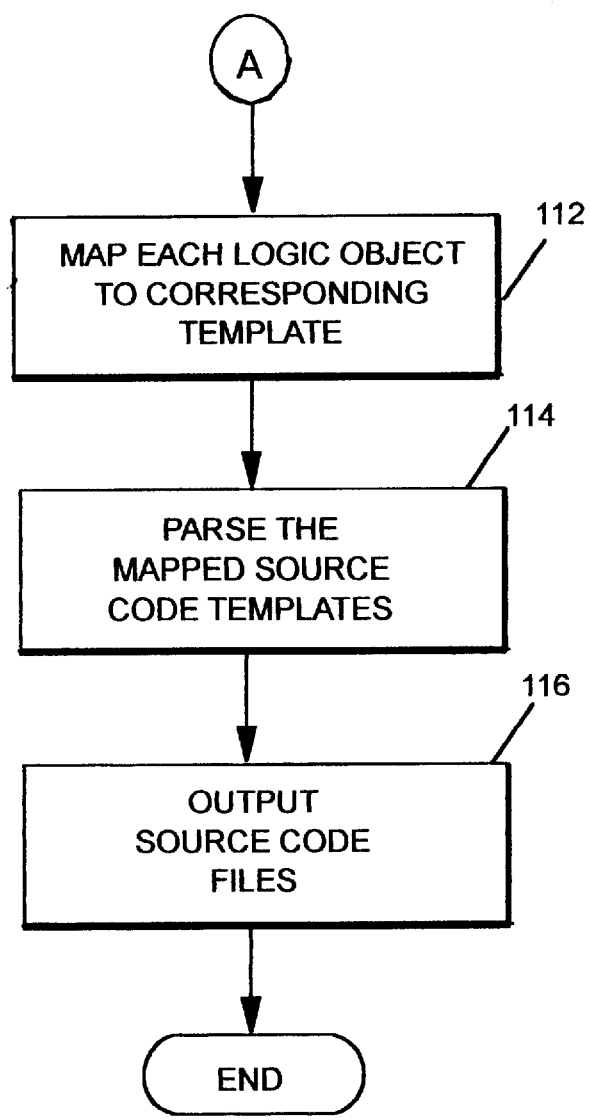
Figure 4A:
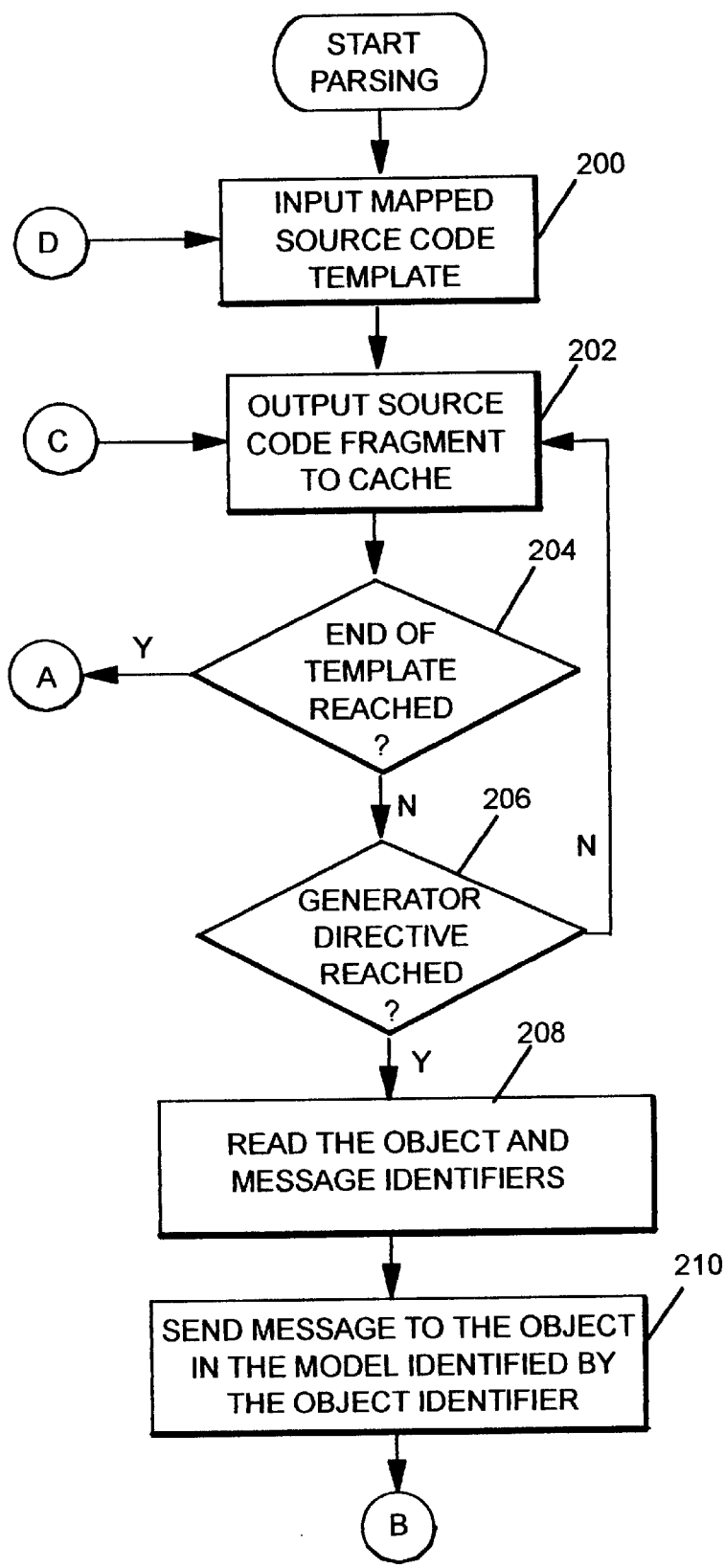
FIGS. 4A and 4B is a flow chart illustrating the technique employed to parse the mapped source code templates.
Figure 4B:
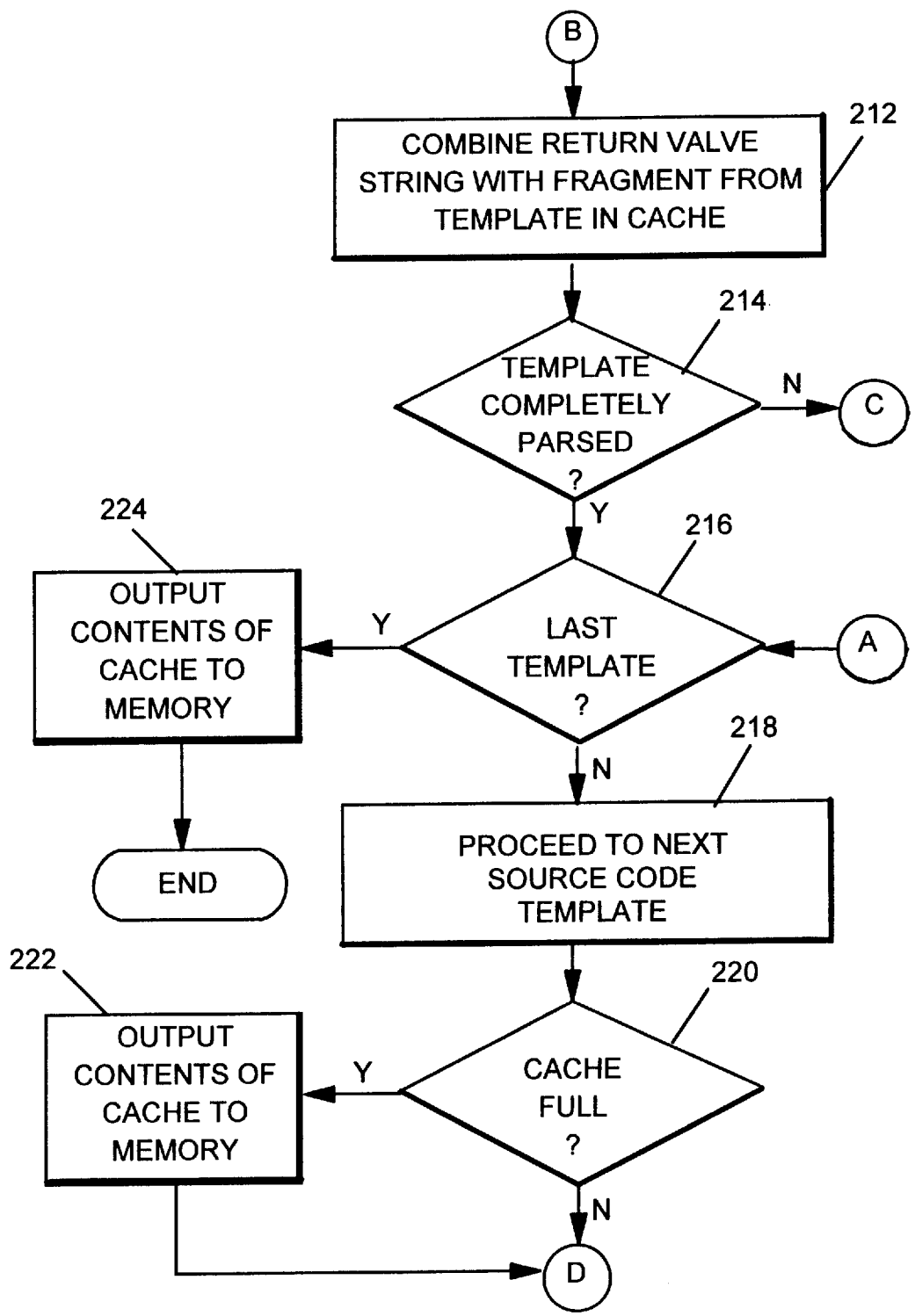

The collection of source code files output from the cache is ready for further processing, as may be required, and will typically be output from the generator engine 36 (or associated memory) in the form of source code files (Step 116 of FIG. 3A). Third generation language source code will typically require compiling to prepare it for execution. A compiler may be included in the generator tool 30 so that compiling of the output source code automatically occurs. Additionally, other code preparation steps may be included in the generator tool 30. For example, the tool 30 may include a debugger for debugging the code. However, elements such as compilers and debuggers are known components for the creation of executable code, and are not crucial to the operation of the present invention.

The skills required to implement the subject invention are well within the skills of those having ordinary skill in the art. While one embodiment of the invention has been discussed, it will be appreciated by those skilled in the art that various modifications and variations are possible without departing from the spirit and scope of the invention.

I claim:

1. In a computing environment, a system for converting a fourth generation language specification into target language source code, comprising:

means for converting the fourth generation language specification into an object oriented mode of the fourth generation language specification;

code templates comprising object oriented code and fragments of source code in a target language;

an object oriented execution environment for enabling execution of object oriented code;

means for mapping the object oriented mode to the code templates; and means for parsing the mapped code templates and causing the object oriented code in the mapped code templates to be executed with said object oriented execution environment to generate additional source code fragments to be combined with the fragments of source code from the mapped code templates to produce source code in a desired target language.

2. A system according to claim 1, wherein a set of code templates is provided for each of the target languages available using said system, and said mapping means maps the object oriented model to the set corresponding to a desired one of the available target languages.

3. A system according to claim 1, further comprising means for designating a target language.

4. A system according to claim 1, further comprising means for creating the fourth generation language specification representing desired program functions.

5. A system according to claim 1, wherein said converting means comprises a class which corresponds to each available construct available in a fourth generation language used to create the fourth generation language specification.

6. A system for converting an object oriented program into target language code comprising:

a set of source code templates corresponding to each available target language, each of the source code templates comprising source code fragments in its corresponding target language and object oriented code;

an object oriented execution environment capable of executing the object oriented code;

mapping means for mapping each object in the object oriented program to the source code template which corresponds to the object in the set of source code templates which corresponds to the target language; and means for parsing the mapped source code templates by extracting the source code fragments from each mapped source code template, executing the object oriented code in each mapped source code template to produce additional source code fragments, combining the additional code and the source code fragments, and outputting resulting source code.

7. A system according to claim 6, wherein the target languages are third generation languages.

8. A method for converting a fourth generation language program model into third generation language source code, comprising the steps of:

converting the fourth generation language program model into an object oriented language equivalent of the model;

mapping each object from the object oriented language equivalent of the model to a corresponding template from a set of code templates associated with a target language; and parsing the mapped code templates to produce source code in the target language, comprising, for each of the mapped code templates, separating a target language code portion and an object oriented code portion from within each mapped code template, executing the object oriented code portion relative to the object oriented language equivalent of the model and receiving a return value, and combining the target language code portion and the return value and outputting the combination as the source code in the target language.

* * * * *